(12) United States Patent
Patel et al.

(10) Patent No.: US 7,213,768 B2
(45) Date of Patent: May 8, 2007

(54) MULTIPLE DEVICE AND/OR USER ASSOCIATION

(75) Inventors: Labhesh Patel, Mountain View, CA (US); Shmuel Shaffer, Palo Alto, CA (US); Gebran Chahrouri, Menlo Park, CA (US); Shantanu Sarkar, San Jose, CA (US); Bruce Moon, Dublin, CA (US); Joseph Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/082,604

(22) Filed: Mar. 16, 2005

(65) Prior Publication Data

US 2006/0208063 A1    Sep. 21, 2006

(51) Int. Cl.
*G06K 19/06*    (2006.01)
(52) U.S. Cl. ..................................... 235/492
(58) Field of Classification Search ................ 235/492
See application file for complete search history.

(56) References Cited

U.S. PATENT DOCUMENTS

| | | | |
|---|---|---|---|
| 5,339,073 A | | 8/1994 | Dodd et al. |
| 5,850,187 A | | 12/1998 | Carrender et al. |
| 5,887,176 A | | 3/1999 | Griffith et al. |
| 6,111,517 A | * | 8/2000 | Atick et al. ................. 340/5.83 |
| 6,115,079 A | * | 9/2000 | McRae ........................ 348/731 |
| 6,553,489 B1 | | 4/2003 | Osler et al. |
| 2002/0163811 A1 | | 11/2002 | Sipala |
| 2004/0128389 A1 | * | 7/2004 | Kopchik ...................... 709/228 |
| 2004/0257202 A1 | * | 12/2004 | Coughlin et al. .......... 340/5.82 |
| 2005/0021626 A1 | | 1/2005 | Prajapat et al. |
| 2005/0093679 A1 | * | 5/2005 | Zai et al. .................... 340/10.2 |
| 2006/0005035 A1 | * | 1/2006 | Coughlin ..................... 713/182 |

OTHER PUBLICATIONS

R. Droms, *Dynamic Host Configuration Protocol*, http://www.ietf.org/rfc/, Bucknell University, Mar. 1997 (RFC 2131), printed Mar. 24, 2005, 43 pages.
S. Alexander et al., *DHCP Options and BOOTP Vendor Extensions*, http://www.ietf.org/rfc/, Silicon Graphics, Inc., Mar. 1997 (RFC 2132), printed Mar. 24, 2005, 32 pages.
G. Stump et al., *The User Class Option for DHCP*, http://www.ietf.org/rfc/, IBM, Nov. 2000 (RFC 3004), printed Mar. 24, 2005, 6 pages.
Y. T'Joens, *DHCP Reconfigure Extension*, http://www.ietf.org/rfc/, Alcatel, Dec. 2001, printed Mar. 24, 2005 (RFC 3203), 6 pages.

(Continued)

*Primary Examiner*—Michael G. Lee
*Assistant Examiner*—Tae W. Kim
(74) *Attorney, Agent, or Firm*—Beyer Weaver LLP

(57) ABSTRACT

Methods and devices are provided for automating a login process and user/device associations. A user's preferred device settings and/or functions may be provisioned automatically. Some implementations provide an automated log out or "sleep" when a user leaves one or more of the devices. Users may be automatically identified and associated. The "presence" of members of a user group may be determined as required for one or more actions to be taken. Some user groups control devices according to which members of a group may have access to certain functions, information, etc., and which may not.

13 Claims, 10 Drawing Sheets

OTHER PUBLICATIONS

M. Patrick, *DHCP Relay Agent Information Option*, http://www.ietf.org/rfc/, Motorola BCS, Jan. 2001 (RFC 3046), printed Mar. 24, 2005, 14 pages.

EPCgl, *Frequently Asked Question*, http://www.epcglobalinc.com/about/faqs.html, printed Mar. 24, 2005, 9 pages.

EPC™ *Tag Data Standards Version 1.1 Rev.1.24*, EPCglobal, Standard Specification, Apr. 1, 2004, 78 pages.

*Global Location Number (GLN) Implementation Guide*, Uniform Code Council, Inc., May 2002, 13 pages.

*The Global Language of Business*, http://www.ean-int.org/locations.html, printed Mar. 24, 2005, 5 pages.

J. Littlefield, *Vendor-Identifying Vendor Options for Dynamic Host Configuration Protocol version 4(DPHCPv4)*, RFC 3925, Oct. 2004, 9 pages.

*Simple Network Management Protocol*, Internetworking Technologies Handbook, Chapter-56, printed Jul. 14, 2005, 12 pages.

International Search Report dated Oct. 13, 2005, from corresponding International Application No. PCT/US05/16484, 6 pp. including Notification of Transmittal (CISCP377WO).

Written Opinion of the Internation Searching Authority dated Oct. 13, 2005, from corresponding International Application No. PCT/US05/16484, 5 pp. (CISCP377WO).

D. Harrington et al, An Architecture for DescribingSimple Network Management Protocol (SNMP) Management Frameworks, RFC 3411, Dec. 2002, 64 pages.

R. Presuhn, Editor, Version 2 of the Protocol Operations for the Simple Network Management Protocol (SNMP), RFC 3416, Dec. 2002, 31 pages.

S. Prajapat et al., US Appl. No. 11/027,350, Agnostic Peripheral Control For Media Communication Appliances, (CISCP400/9760).

International Search Report dated Feb. 17, 2006, from related International Application No. PCT/US05/15322, 5 pp. including Notification of Transmittal (CISCP378WO).

Written Opinion of the International Searching Authority dated Feb. 17, 2006, from related International Application No. PCT/US05/15322, 3 pp. (CISCP378WO).

Office Action mailed Aug. 9, 2006 for U.S. Appl. No. 10/866,507, filed Jun. 9, 2004.

\* cited by examiner

| User Name | Computer | Telephone | Printer | Camera | Preferences |
|---|---|---|---|---|---|
| Gaia | 111 | | | | |
| | | | | | |
| | | | | | |

*Fig. 2B*

| User Name | Computer | Telephone | Printer | Camera | Preferences |
|---|---|---|---|---|---|
| Gaia | 111 | | | | Telemarketer |
| | | | | | |
| | | | | | |

Fig. 2C

| User Name | Computer | Telephone | Printer | Camera | Preferences |
|---|---|---|---|---|---|
| Gaia | 111 | 101 | | | Telemarketer |
| | | | | | |
| | | | | | |

Fig. 2D

| User Name | Computer | Telephone | Printer | Camera | Preferences |
|---|---|---|---|---|---|
| Gaia | 111 | 101 | 121 | | Telemarketer |
| | | | | | |
| | | | | | |

*Fig. 2E*

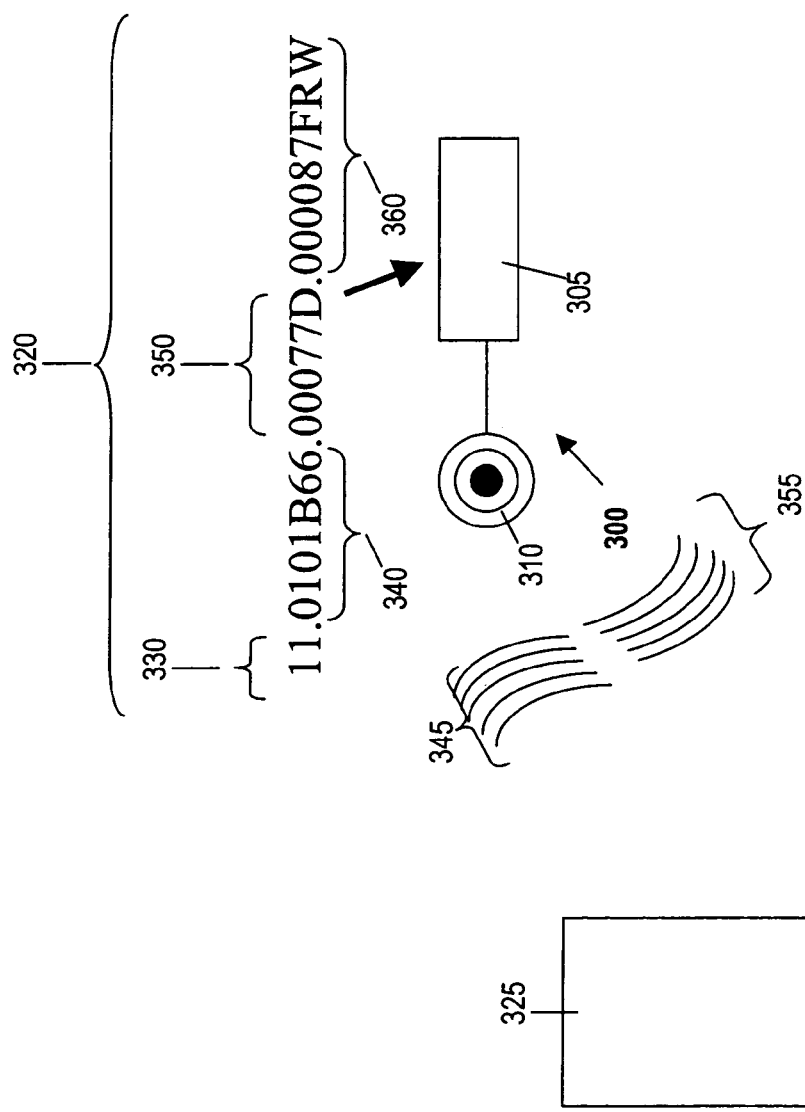

MULTIPLE DEVICE AND/OR USER ASSOCIATION

BACKGROUND OF THE INVENTION

1. Field of the Invention

The present invention relates to the selection and configuration of networked devices and the authentication of people who may wish to access one or more such devices.

2. Description of the Related Art

There are many situations in which the same networked device(s) may be used by different people at different times. Such devices include, but are not limited to, personal computers ("PCs"), telephones, printers, web cameras, speakers and other peripheral devices. For example, if the same personal computer is shared by more than one person at a workplace, each person must log in separately and indicate his or her own device associations and preferences.

One example of a workplace in which the same networked equipment will be shared by multiple users during the same day is a "call center" operation, such as a customer service call center. Each call center station includes at least a telephone and an associated PC, and may include a headset, a printer and other peripheral devices. The same devices will be used by different people at different times of day. Moreover, each call center agent will typically take the first available seat, which will generally not be the same seat from one day to the next. Accordingly, each agent needs to log in separately upon arrival at the call center.

A graphical user interface ("GUI") known as an "agent desktop" or a "supervisor desktop" is often used to control a call center agent's telephone access. Some such desktops are supplied by the present assignee under the product names Cisco Agent Desktop "CAD" and Cisco Supervisor Desktop "CSD".

Among other things, the agent desktop allows the call center agent to indicate when the agent is ready to receive calls and when the agent is not. The agent needs to log into the "agent desktop" application and indicate "ready" by clicking on an area of the screen. The back end system then receives a "ready" indication and knows that calls can be routed to the agent. Similarly, if the agent clicks "not ready," the back end system will not route calls to the agent.

However, when the agent leaves and forgets to indicate "not ready," calls will continue to be routed to the agent. The calls will not be answered until the agent returns. Other systems may retrieve the call and return it to the queue for handling by another agent. In either case, the quality of customers' service is compromised. Such situations will lead to (or increase) customer dissatisfaction, particularly if the customers are calling because they are having some sort of problem with a device, a service, etc.

In some situations, the presence of more than one person is necessary for a particular operation to occur. For example, before a customer can access a safety deposit box in a bank vault, both the customer and a bank employee must locate and use a physical key. Similar situations arise when approval is required from a supervisor for, e.g., cashing a check for more than a predetermined amount of money, making a correction on a cash register, applying a promotional discount, etc.

It would be desirable to overcome these and other limitations of the prior art.

SUMMARY OF THE INVENTION

The present invention includes methods and devices for automating a login process and user/device associations. Some such implementations allow a user's preferred device settings and/or functions, sometimes referred to herein as device "personalities," to be provisioned automatically. Some implementations provide an automated log out or "sleep" when a user leaves one or more of the devices.

Other aspects of the invention provide for automated association of user groups. According to some such aspects, methods and devices are provided for conveniently determining the "presence" of members of a user group that are required for one or more actions to be taken. Some user groups control devices according to which members of a group may have access to certain functions, information, etc., and which may not.

Some implementations of the invention provide a method of associating multiple devices with a user. The method includes these steps: reading, by a first radio frequency identification ("RFID") reader in communication with a first device, an RFID tag assigned to a user; associating the first device with the user; and determining whether the RFID tag is read within a predetermined time by a second RFID reader in communication with a second device. The first device may be, e.g., a personal computer, a telephone or a peripheral device.

The method may include the step of associating the second device with the user when the RFID tag is read within a predetermined time by the second RFID reader. The method may also include the step of determining preferences of the user based RFID tag data read during the reading step and/or of configuring the first device according to the preferences.

Some embodiments of the invention provide a system for associating multiple devices with one or more users. The system includes these elements: a RFID reader; a first device in communication with the first RFID reader; an apparatus for associating the first device with a first user when the RFID reader reads a first RFID tag assigned to the first user; and a device for determining whether the first RFID tag is read within a predetermined time by a second RFID reader in communication with a second device.

Alternative embodiments of the invention provide an apparatus that includes a first RFID reader and at least one logic device configured to do the following: receive a user's RFID tag data read by the RFID reader; determine an identity and preferences of a user according to the RFID tag; associate a first device with the user; and assign a personality to the first device according to the preferences.

The may also include an interface for networking with a plurality of devices and associated RFID readers, wherein a logic device is further configured to determine whether the user's RFID tag data are read by one of the associated RFID readers within a predetermined time. A logic device may be further configured to associate one of the plurality of devices with the user when the user's RFID tag data are read by one of the associated RFID readers within the predetermined time.

Other implementations of the invention provide a multi-user authentication method that includes these steps: reading first encoded information at a first time; reading second encoded information at a second time; authenticating a first person and a second person according to the first encoded information and the second encoded information; determining whether a time interval between the first time and the second time is less than or equal to a predetermined time interval; and authorizing a procedure when the time interval between the first time and the second time is less than or equal to the predetermined time interval.

At least one of the reading steps may involve reading an RFID tag. The reading steps may be performed in separate locations. The method may also include the step of performing the procedure in a different location from a location at which at least one of the reading steps is performed. The authorizing step may also involve providing a first level of authorization to the first person and a second level of authorization to the second person.

Alternative implementations of the invention provide a method of associating multiple devices with a user. The method includes these steps: reading RFID tag data from an RFID tag assigned to a user; determining user preferences based on the RFID tag data; and applying the user preferences to at least one of a computer, a telephone or a peripheral device according to the user preferences. The may also include the step of associating a plurality of devices with the user based on the RFID tag data.

The method may also include the steps of determining whether each of the plurality of devices is initialized and, when it is determined that a device is not initialized, initializing the device.

An additional method of the invention provides for automatically managing a call center. The method includes these steps: detecting that an RFID tag associated with a call center agent is no longer in the proximity of the call center agent's work area; and providing an indication that the call center agent is not ready when such a detection is made.

Yet other aspects of the invention provide a method of controlling access to content. The method includes these steps: assigning a first level of authorization to a first person associated with a first RFID tag; assigning a second level of authorization to a second person associated with a second RFID tag; permitting the first person to view content according to the first level of authorization when the first RFID tag is read by an RFID reader associated with a display device; and preventing the second person from viewing the content when the second RFID tag is read by the RFID reader The display device may be a display screen of a personal computer. The preventing step may involve invoking a screen saver on the display screen to conceal the content. Alternatively, the display device may be a television. The preventing step may involve changing a channel of the television.

The methods of the present invention may be implemented, at least in part, by hardware and/or software. For example, some embodiments of the invention provide computer programs embodied in machine-readable media. The computer programs include instructions for controlling one or more devices to perform the methods described herein.

BRIEF DESCRIPTION OF THE DRAWINGS

FIGS. 2B–2E are tables that illustrate a method of associating a user with multiple devices according to some aspects of the present invention.

FIG. 3 is a diagram illustrating an RFID tag.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Figure 1:
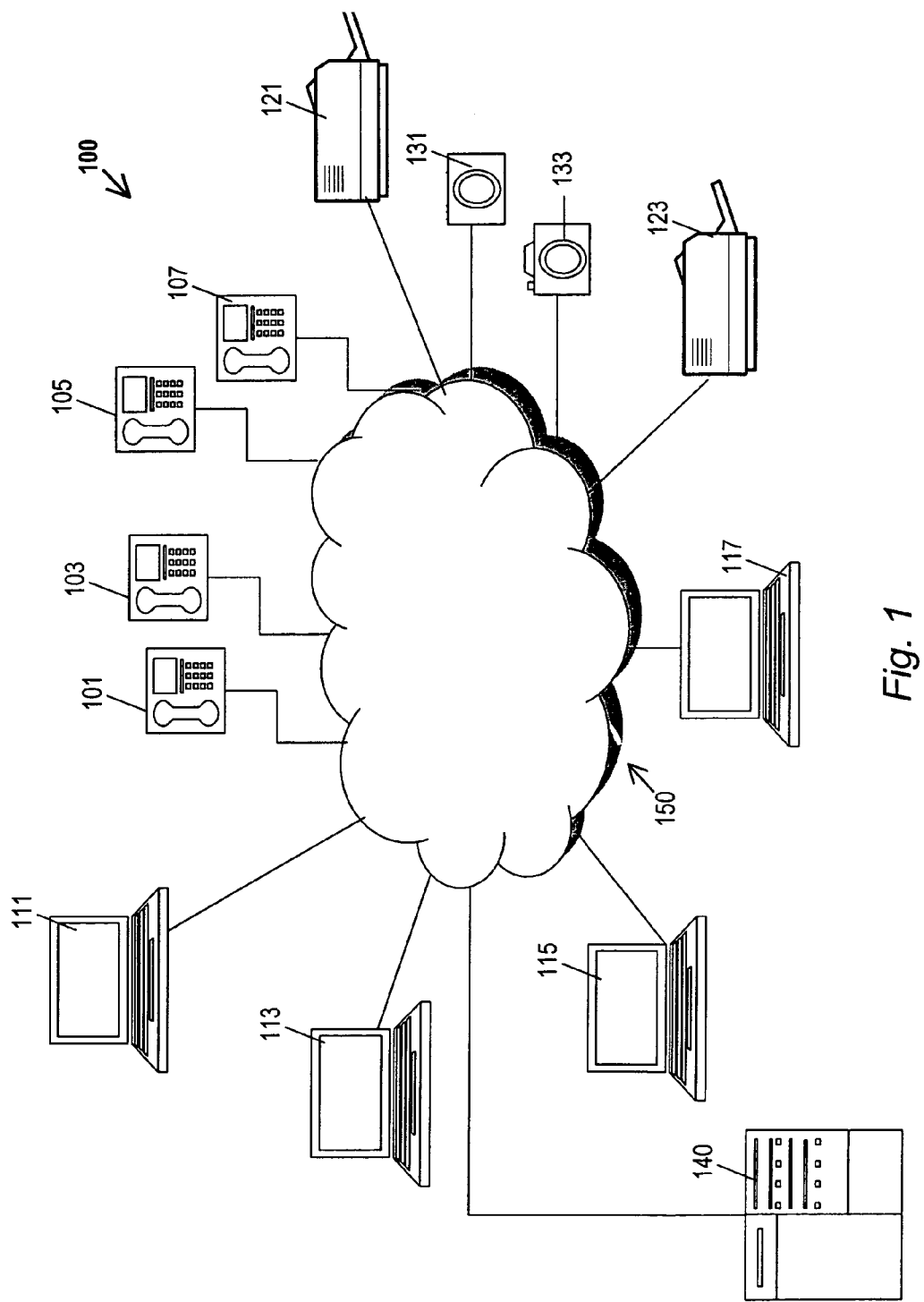
FIG. 1 is a network diagram illustrating a network that may be configured according to some implementations of the present invention.

FIG. 1 illustrates system 100, which may be configured to perform some methods of the invention. Those of skill in the art will realize that system 100 could include other types of devices and/or different numbers of devices than are shown in FIG. 1.

System 100 includes telephones 101, 103, 105 and 107, which are VoIP telephones in this example. Here, network 150 is an Ethernet that is in communication with the Internet. However, network 150 could be any suitable type of network. In this example, system 100 also includes PCs 111, 113, 115 and 117, as well as printers 121 and 123 and cameras 131 and 133.

Here, cameras 131 and 133 are "webcams" used for security purposes. Accordingly, not all users of system 100 are authorized to use cameras 131 and 133 or to have access to data from these cameras.

As will be discussed in more detail below, in preferred implementations of the invention, at least some of the devices in system 100 have an RFID reader or a comparable device (e.g., a bar code scanner). In some implementations, all devices in system 100 include an associated RFID reader, whether or not an RFID reader is part of each device or directly connected to each device. For example, an RFID reader could be associated with a device (and preferably labeled as such), but could be disposed in a location separate from the device.

The RFID reader (or other device) is used to read data from an RFID tag (or the like) that has been assigned to a user. By reading the RFID tag data, at least the user's identity ("ID") can be determined, thereby allowing a user to select a device associated with the RFID reader. As used herein, the term "user ID" or the like can mean different things. For example, a user ID can be substantially complete identification information (such as the level of identification provided by a passport). Alternatively, a user ID can be more limited information such as a user's name, employee number, and the role he can assume.

In some implementations, the RFID tag will include user preferences, or data from which user preferences may be determined (e.g., by reference to a networked database). In some preferred implementations, at least some of the RFID readers will only be able to read RFID tags within a relatively small radius (e.g., 1 meter or less), in order to avoid confusion about which device a user intends to select.

In alternative implementations, each of the devices has an associated sensor or similar device, such as an infrared sensor, that is configured to receive information that is pertinent to implementing aspects of the invention. In some implementations, a device similar to a remote control, a personal digital assistant or the like is used to select desired devices and communicate user identification data and/or preferences.

One exemplary method 200 of the invention will now be described with reference to FIGS. 1 and 2A–2E. The reader should note that the steps of the methods described herein need not be performed (and in some implementations are not performed) in the order indicated. Moreover, some implementations include more or fewer steps than shown and/or described.

Figure 2A:
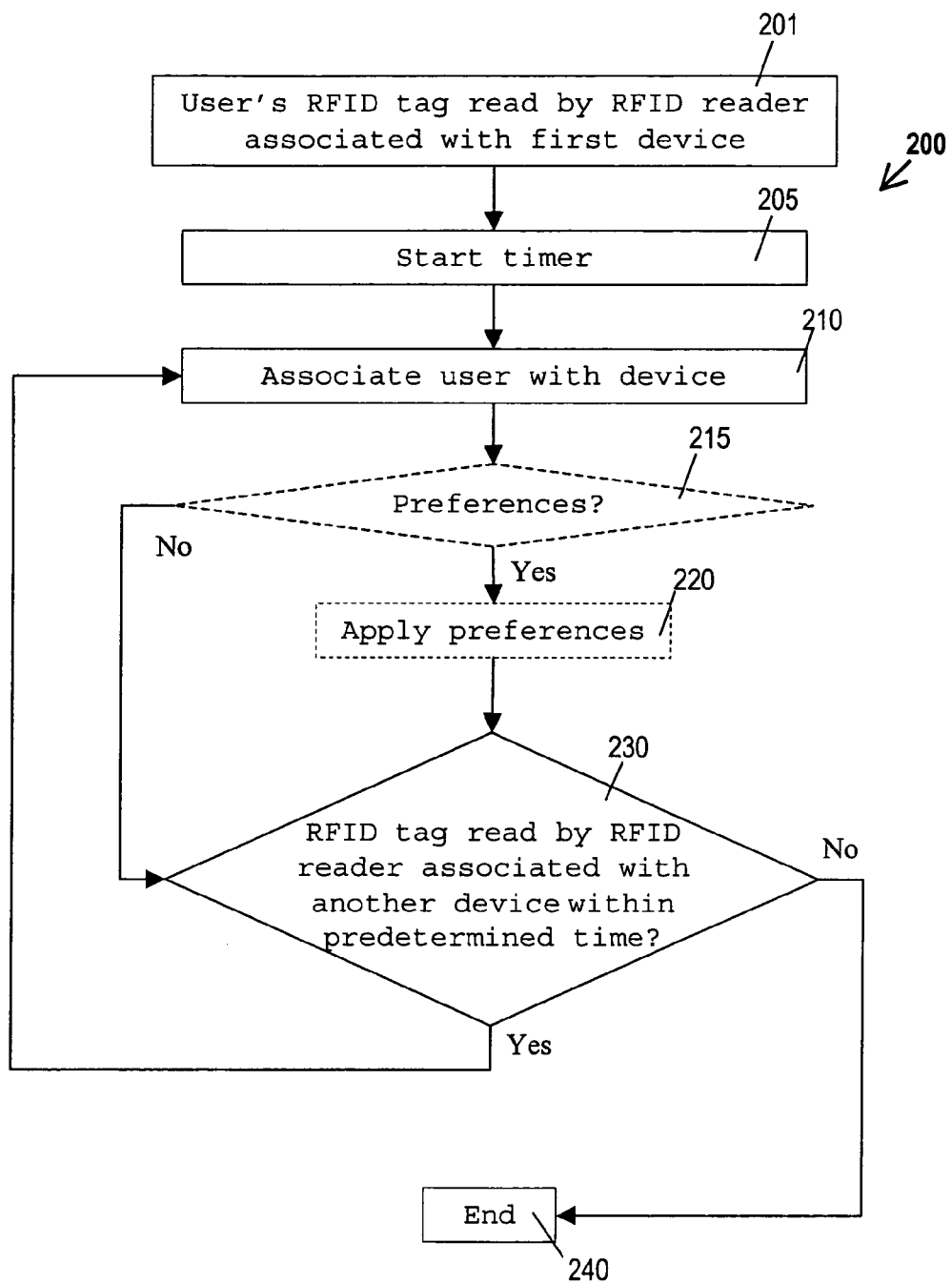
FIG. 2A is a flow chart that outlines some methods of the present invention.

In step 201 of FIG. 2A, a user moves her RFID tag within range of an RFID reader associated with one of the devices in a network and the RFID reader reads the RFID tag. The RFID tag may be, for example, embedded in a card, a fob, a bracelet, etc. Here, the RFID reader is associated with PC 111 of system 100. (FIG. 1) In response, a timer is started (step 205) and the user is associated with PC 111. (Step 210.)

In this example, steps 205 and 210 are performed by one or more logic devices of PC 111. Moreover, in this example the user is automatically logged on to PC 111 after the RFID reader reads her RFID tag.

Association table 244 of FIG. 2B provides an example of a data structure that may be used as part of the process of associating a user with a device. In this example, the data structure is stored in a memory of PC 111. In another embodiment, the association table 244 is stored on a server, such as server 140 of FIG. 1, that is attached to the network 150. FIG. 2B indicates the state of association table 244 after step 210 has been performed. The user's name, Gaia, has been determined from RFID tag data read from the user's RFID tag. Accordingly, "Gaia" has been written in field 245. The associated computer, PC 111, has been written in field 250.

Referring again to FIG. 2A, in optional step 215 it is determined whether preference data are indicated by or associated with the user's RFID tag data. In some such implementations, the preference data are encoded in the RFID tag and in other implementations the preference data are stored elsewhere (e.g., in a storage device in communication with network 150) and determined with reference to information in the RFID tag.

In this example, the user Gaia is a telemarketer and preferences appropriate for telemarketing are indicated by her RFID tag. Therefore, these preferences are determined in step 215 and applied in step 220. Accordingly, preferences field 270 of association table 244 is updated to indicate "Telemarketer." (FIG. 2C.)

Among other things, as a telemarketer Gaia is provided with access to databases of contact information. Here, the contact information includes telephone numbers, information about the spending habits of the contacts, income information, information regarding prior communications with contacts and other information pertinent for telemarketing. However, Gaia is not provided with the ability to access other information, such as payroll data, security data and financial data pertaining to the enterprise that owns system 100.

However, many types of user preference data may be indicated by and/or cross-referenced by data read from a user's RFID tag. For example, other preferences may be established according to other functions performed by a user (e.g., technical support, marketing, recruiting, accounting, human resources, etc.) In some implementations, the preferences may indicate a user's preferred settings for a display device, of one or more user input devices, speakers, etc.

In step 230, it is determined whether the user's RFID tag is read by a reader associated with another device within a predetermined time, which could be any convenient time (10 seconds, 30 seconds, one minute, etc.). Here, a timer has been started in step 205 and a single predetermined time runs from the time that this timer is started. In other implementations, a timer is re-started each time that an RFID reader associated with a new device reads the user's RFID tag within a previous predetermined time.

The process of determining whether the user's RFID tag is read by a reader associated with another device can be accomplished in various ways. In this example, each time an RFID reader in communication with network 150 reads a user's RFID tag, the read is broadcast to all devices on the network. The broadcast indicates the identity of the broadcasting device.

Here, an RFID reader associated with telephone 101 reads Gaia's tag within a predetermined time of 30 seconds from when the timer was started. When telephone 101's RFID reader reads the tag, the reader broadcasts the read and indicates the identity of telephone 101. PC 111 receives the broadcast and determines that Gaia's tag was read by telephone 101 within the predetermined time.

Therefore, PC 111 causes telephone 101 to be associated with user Gaia. (Step 210.) Association table 244 is updated to add telephone 101 in field 255, as shown in FIG. 2D. PC 111 replies to telephone 101 with association data, e.g., by forwarding association table 244 or a similar data structure to telephone 101. If any preference data applicable to a telephone are determined in step 215, telephone 101 is configured accordingly (step 220). In an alternative implementation, a device (for example, a PC) communicates with an association server and determines the association of all network devices with the appropriate users and other devices.

In step 230, it is once again determined whether Gaia's RFID tag is read by another RFID reader associated with another networked device within the predetermined time. In this example, an RFID reader associated with printer 121 reads Gaia's tag within the predetermined time. When the RFID reader associated with printer 121 reads the tag, the reader broadcasts the read and indicates the identity of telephone 101. PC 111 receives the broadcast and determines that Gaia's tag was read by printer 121 within the predetermined time.

Therefore, PC 111 (preferably in collaboration with association server 140) causes printer 121 to be associated with user Gaia. (Step 210.) Association table 244 is updated to add printer 121 in field 260, as shown in FIG. 2E. PC 111 replies to printer 121 and telephone 101 with association data. If any preference data applicable to a printer are determined in step 215, printer 121 is configured accordingly (step 220).

In this example, Gaia does not select another device within the predetermined time, so the process ends in step 240. In some implementations of method 200, a user will have at least one opportunity to verify whether the association table is correct and complete (and, if not, to correct the association table) before the process ends.

In other implementations, if a user's presence is not detected near at least one of the associated devices within a predetermined time, at least one of the devices will automatically log the user off or enter a sleep mode. For example, if Gaia were to leave PC 111, the RFID reader associated with PC 111 would soon detect her absence and start a timer. If Gaia failed to return for more than a predetermined length of time (e.g., 1 minute, 5 minutes or any appropriate length of time), PC 111 would log her out. The predetermined time should be established according to factors such as the sensitivity of information that the user is authorized to access, the potential for inconvenience caused to others, etc. For example, a call center agent's telephone and/or PC should rather quickly indicate when the agent has left his or her station, in order to ensure that calls are not routed to an absent call center agent's station.

As shown in FIG. 3, an RFID tag 300 includes microprocessor 305 and antenna 310. In this example, RFID tag 300 is powered by a magnetic field 345 generated by an RFID reader 325. The tag's antenna 310 picks up the magnetic signal 345. RFID tag 300 modulates the signal 345 according to information coded in the tag and transmits the modulated signal 355 to the RFID reader 325.

In some preferred implementations, the users' preferences are configured in association server 140. An RFID tag may be used to trigger the authentication and association processes. Once the authentication completes successfully, the association server in collaboration with the endpoint, configures and personalizes the endpoint.

RFID tags use the Electronic Product Code ("EPC" or "ePC") format for encoding information. An EPC includes a variable number of bits of information (common formats are 64, 96 and 128 bits), which allows for identification of, for example, individual products as well as associated information. As shown in FIG. 3, EPC 320 includes header 330, EPC Manager field 340, Object class field 350 and serial number field 360. EPC Manager field 340 contains manufacturer information. Object class field 350 includes a product's stock-keeping unit ("SKU") number. Serial number field 360 is normally a 40-bit field that can uniquely identify the specific instance of an individual product i.e., not just a make or model, but also down to a specific "serial number" of a make and model.

In some implementations of the invention, one or more of the foregoing fields are used by the call center to identify the group and skill set that the agent is teamed with. Other implementations of the invention use EPC codes that are specifically designed for identifying people. The document entitled "EPC™ Tag Data Standards Version 1.1 Rev. 1.24, Standard Specification" (Apr. 1, 2004 EPCglobal®) (the "Tag Data Standards" document), which is hereby incorporated by reference for all purposes, describes relevant methods of encoding user ID information in RFID tags.

Figure 4:
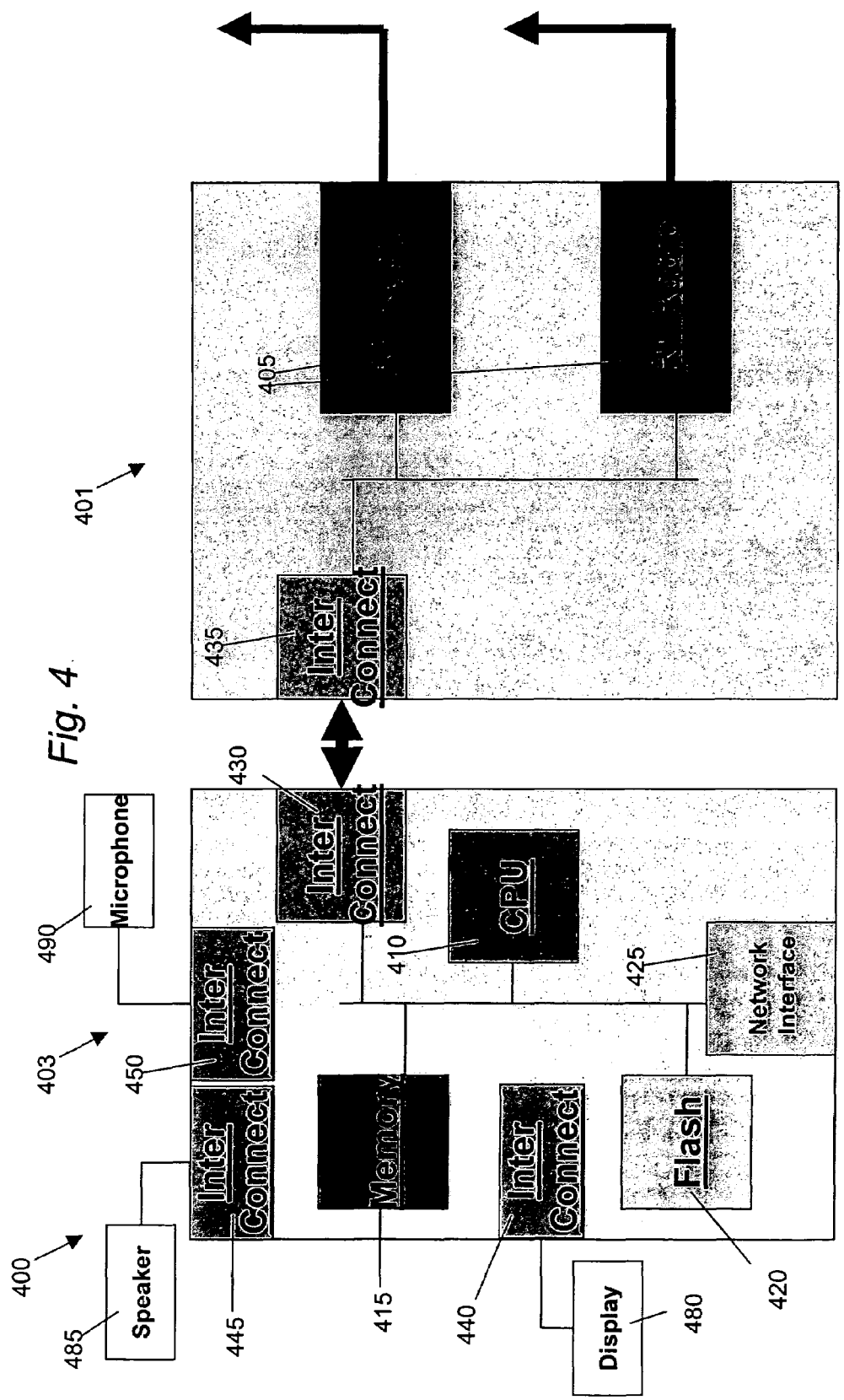
FIG. 4 is a block diagram that illustrates one embodiment of a device having an RFID reader that may be configured according to the present invention.

FIG. 4 illustrates device 400, which may be configured to implement some aspects of the invention. In this example, device 400 is a telephone that includes controller portion 403 and a "stripped down" version of RFID reader portion 401. Here, the intelligence for controlling RFID reader 401 resides in controller 403. In other embodiments, RFID reader 401 includes memory and at least one logic device for performing some or all of the functions of controller 403.

Interconnect 430 of controller 403 is configured for communication with interconnect 435 of RFID reader portion 401. In this example, interconnects 440, 445 and 450 provide communication between controller 403 and display 480, speaker 485 and microphone 490, respectively. The communication may be via any convenient medium and format, such as wireless, serial, point-to-point serial, etc.

RFID reader 401 includes one or more RF radios 405 for transmitting RF waves to, and receiving modulated RF waves from, RFID tags. RF radios 405 provide raw RF data that is conveyed to controller 403 and converted by an analog-to-digital converter (not shown).

The RF data are preferably stored, at least temporarily, in memory 415. Preferably, CPU 410 filters out RFID tag data from RFID tags that do not provide data relevant to the present invention. For example, CPU 410 preferably reads RFID tag data from RFID reader portion 401 that has been stored in memory 415, filters out RFID tag data from commercial products and transmits only those data pertinent to the present invention via network interface 425.

Network interface 425 may be any convenient type of interface configured for communication between device 400 and an Ethernet, the PSTN, the Internet or other appropriate network. Memory 415 may store information received via network interface 425, including but not limited to association data and user preference data. Memory 415 may also be used as a buffer for information received by or transmitted from network interface 425.

Although only one RFID reader portion 401 is depicted in FIG. 4, some embodiments of the present invention include multiple RFID readers 401. For example, some implementations feature a single device 400 having a plurality of RFID reader portions 401, each of which can read only within a small radius. Each RFID reader corresponds to a separate device and is preferably labeled as such. When a user's RFID tag is brought near the RFID reader corresponding to a device, that device is associated with the user as described elsewhere herein. Accordingly, other devices 400 in the network may be selected in accordance with the present invention even if they have no RFID reader portion 401.

In this example, CPU 410 controls device 400 and other attached devices according to software stored in local memory. In some implementations of the invention, the user/device associations described herein (e.g., with reference to FIGS. 2A–2E) are formed by CPU 410 and stored locally, e.g. in memory 415. Flash memory 420 may be used to store a program (a "bootloader") for booting/initializing controller 403. The bootloader is usually stored in a separate, partitioned area of flash memory 420. In some implementations, flash memory 420 is used to store personality information and other configuration information.

Some aspects of the invention provide for automated association of user groups. Some such aspects determine the presence of members of a user group that are required for one or more actions to be taken. The actions may be any action requiring a heightened level of control and/or security, such as access to money, weapons, sensitive information, drugs, etc.

Figure 5:
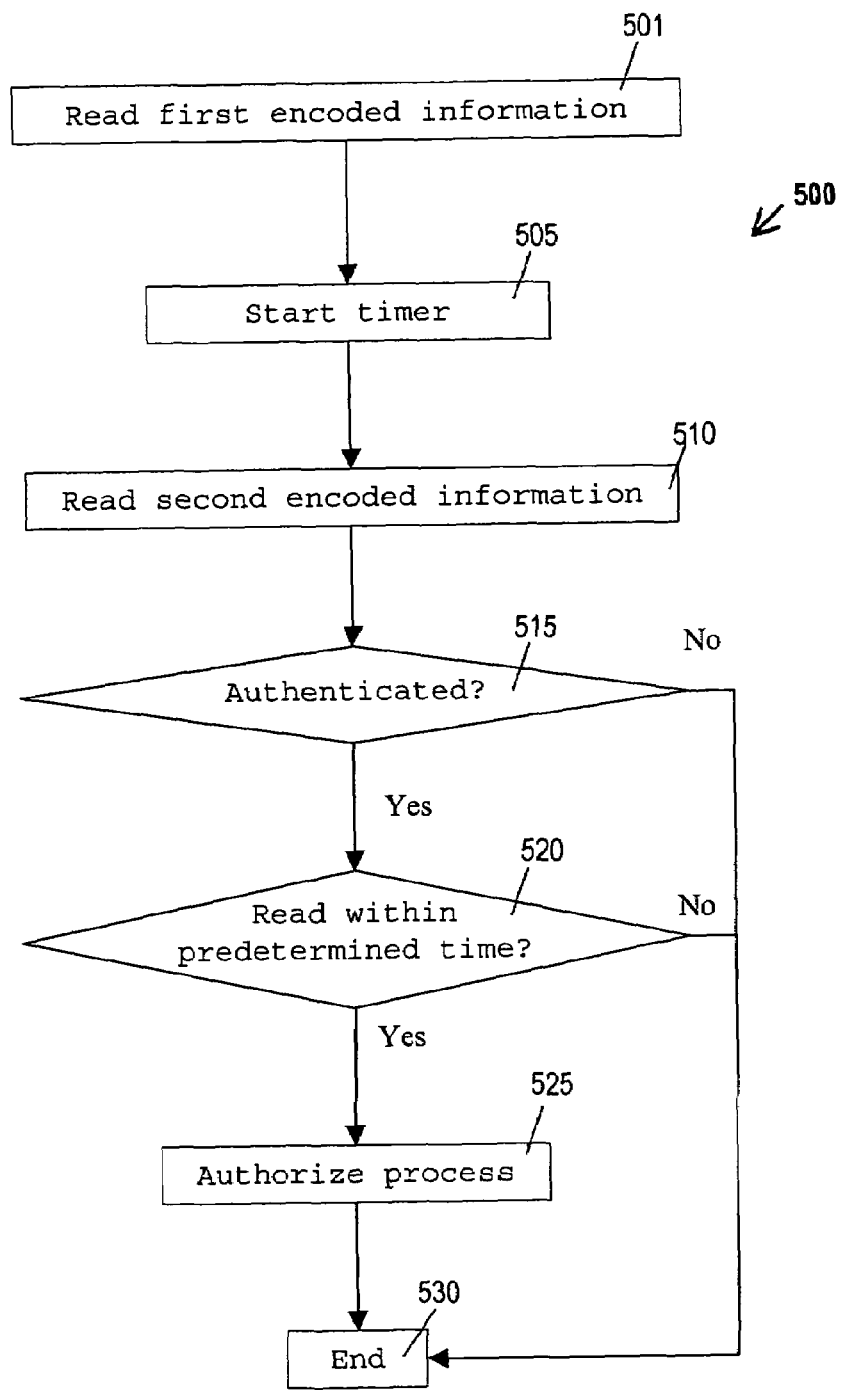
FIG. 5 is a flow chart that outlines other methods of the present invention.

FIG. 5 is a flow chart that illustrates method 500, which is one such method of the present invention. In step 501, encoded information is read, e.g., from a bar code or an RFID tag. In this example, a first RFID tag is read by a first RFID reader in a first location. Here, the first RFID tag is assigned to a bank teller and the first RFID reader is near the bank teller's station. The bank teller has contacted her supervisor because a customer wishes to cash a check in excess of an amount that the bank teller can personally authorize. After the bank teller's RFID tag is read, a timer is started (step 505). Step 505 may be performed, for example, by a networked PC that is in communication with the RFID reader and is positioned near the bank teller.

In step 510, encoded information is read from the supervisor's RFID tag. In this example, step 510 is performed by a second RFID reader that is in a separate location near the supervisor's desk and is networked to the first RFID reader and the PC. In some implementations of the invention, more than two sources of encoded information are read. For example, an RFID tag assigned to the customer wishing to cash the check may be read.

In step 515, it is determined whether the RFID tags are authenticated. Step 515 may be performed, e.g., by a networked PC that is positioned near the bank teller or the supervisor. In this example, steps 515 and 520 are performed by the PC that performed step 505. The authentication procedure may be performed according to any convenient method know in the art. If the information provided by one of the RFID tags is not authenticated, the process ends.

If the authentication process is successful, it is determined whether the second RFID tag was read within a predetermined time. If so, the process is authorized (step 525). In this example, the second RFID tag was both authenticated and read within the predetermined time. Therefore, the bank teller is authorized to cash the customer's check in step 525. In step 530, the process ends.

Some user groups that are formed according to the present invention control devices according to which members of a group may have access to certain functions, information, etc., and which may not. For example, adults in a home may wish to prevent children from viewing "adult" photographs, videos or displays on a television or personal computer. The adults and the children may be part of a user group within which the presence of the children causes a display of adult content to cease. For example, a controller may receive a read from an RFID tag assigned to one of the children and control a television to change its channel from an adult content channel to an educational channel.

In a similar manner, if the system detects that a visitor is in the vicinity of a PC that may be displaying confidential information, the system invokes a screensaver in some implementations. The screensaver conceals the confidential information and alerts the user that a visitor who is not authorized to view the confidential information is in the vicinity. The fact that confidential information is being displayed may be determined by any means known by those of skill in the art.

Figure 6:
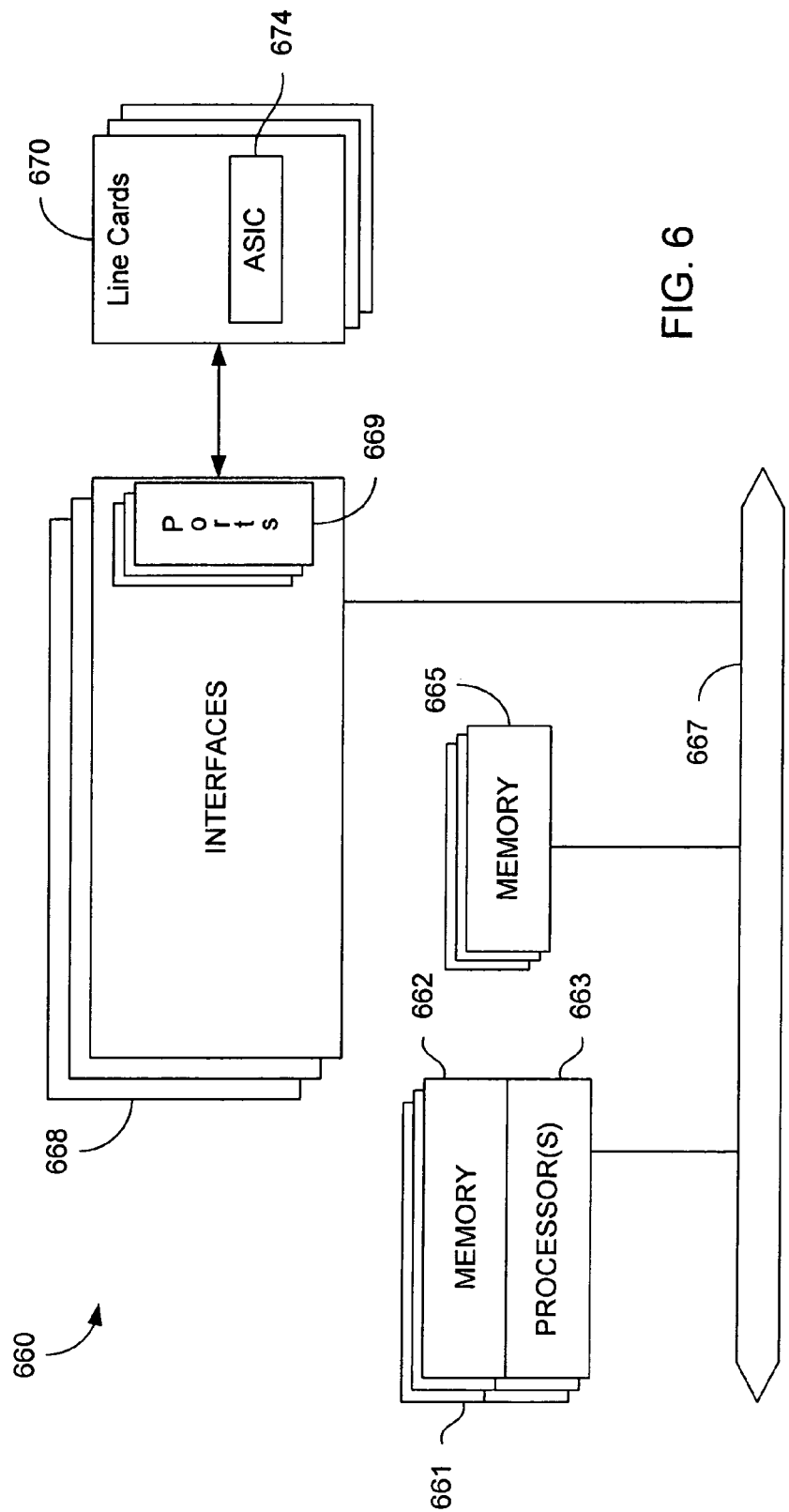
FIG. 6 illustrates one example of a network device that may be configured to implement some methods of the present invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media.

The interfaces 668 are typically provided as interface cards (sometimes referred to as "line cards" or network interface cards (NICs)) 670. Generally, line cards 670 control the sending and receiving of data packets over the network and sometimes support other peripherals used with the network device 660. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

In some embodiments, one or more of line cards 670 includes at least one independent processor 674 and, in some instances, volatile RAM. Independent processors 674 may be, for example ASICs or any other appropriate processors. According to some such embodiments, these independent processors 674 perform at least some of the functions of the logic described herein. In some embodiments, one or more of interfaces 668 control such communications-intensive tasks as media control and management. By providing separate processors for the communications-intensive tasks, line cards allow the master microprocessor 662 efficiently to perform other functions such as routing computations, network diagnostics, security functions, etc.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system (e.g. Linux, VxWorks, etc.), and any appropriate applications software.

CPU 662 may include one or more processors 663 such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 6) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. A multi-user authentication method, comprising;
reading first encoded information at a first time;
reading second encoded information at a second time;
authenticating a first person and a second person according to the first encoded information and the second encoded information;
determining whether a time interval between the first time and the second time is less than or equal to a predetermined time interval; and
authorizing a procedure when the time interval between the first time and the second time is less than or equal to the predetermined time interval.

2. The method of claim 1, wherein at least one of the reading steps comprises reading a radio frequency identification ("RFID") tag.

3. The method of claim 1, wherein the reading steps are performed in separate locations.

4. The method of claim 1, further comprising the step of performing the procedure in a different location from a location at which at least one of the reading steps is performed.

5. The method of claim 1, wherein the authorizing step further comprises providing a first level of authorization to the first person and a second level of authorization to the second person.

6. A multi-user authentication system, comprising:
first reading means for reading first encoded information at a first time;
second reading means for reading second encoded information at a second time;
means for authenticating a first person and a second person according to the first encoded information and the second encoded information;
means for determining whether a time interval between the first time and the second time is less than or equal to a predetermined time interval; and
means for authorizing a procedure when the time interval between the first and second time is less than or equal to the predetermined time interval.

7. The system of claim 6, wherein at least one of the first reading means and the second reading means comprises a radio frequency identification ("RFID") tag reader.

8. The system of claim 6, wherein the first reading means and the second reading means are disposed in separate locations.

9. The system of claim 6, further comprising means for performing the procedure in a different location from a location at which at least one of the reading means is located.

10. The system of claim 6, wherein the first reading means comprises the same device as the second reading means.

11. A method of controlling access to content, the method comprising;
assigning a first level of authorization to a first person associated with a first RFID tag;
assigning a second level of authorization to a second person associated with a second RFID tag;
permitting the first person to view content according to the first level of authorization when the first RFID tag is read by an RFID reader associated with a display device; and
causing content being viewed by the first person to be concealed when the second RFID tag is read by the RFID reader and the second level of authorization is does not permit viewing the content.

12. The method of claim 11, wherein the display device comprises a display screen of a personal computer and wherein the preventing step comprises invoking a screen saver on the display screen to conceal the content.

13. The method of claim 11, wherein the display device comprises a television and wherein the preventing step comprises changing a channel of the television.

* * * * *